P. J. COLLINS.
MUFFLER FOR ENGINES.
APPLICATION FILED DEC. 21, 1912.
1,067,467.
Patented July 15, 1913.
2 SHEETS—SHEET 2.
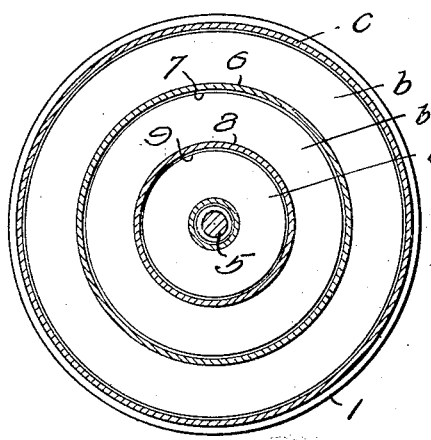
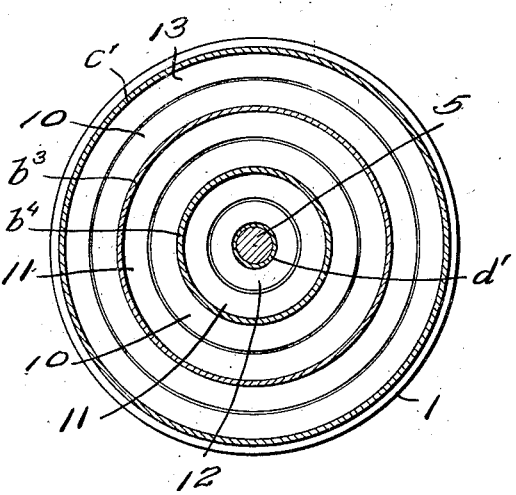
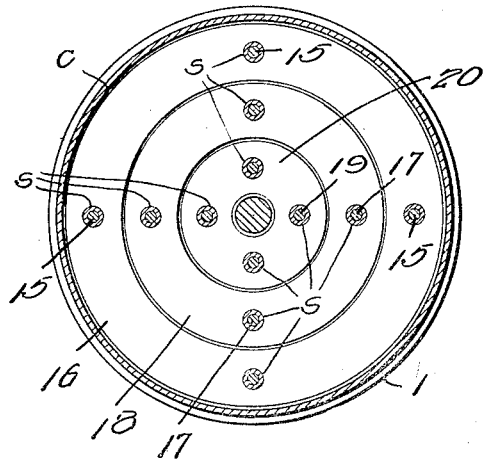
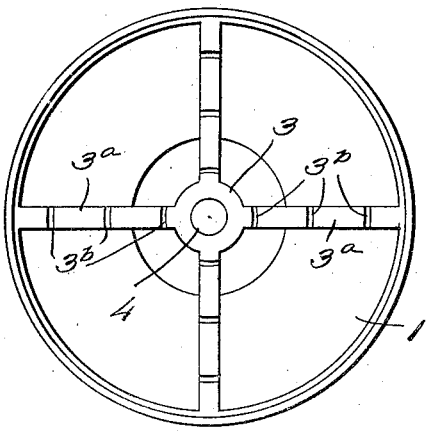
Witnesses
Inventor
P. J. Collins
By Watson & Boyden
Attorneys

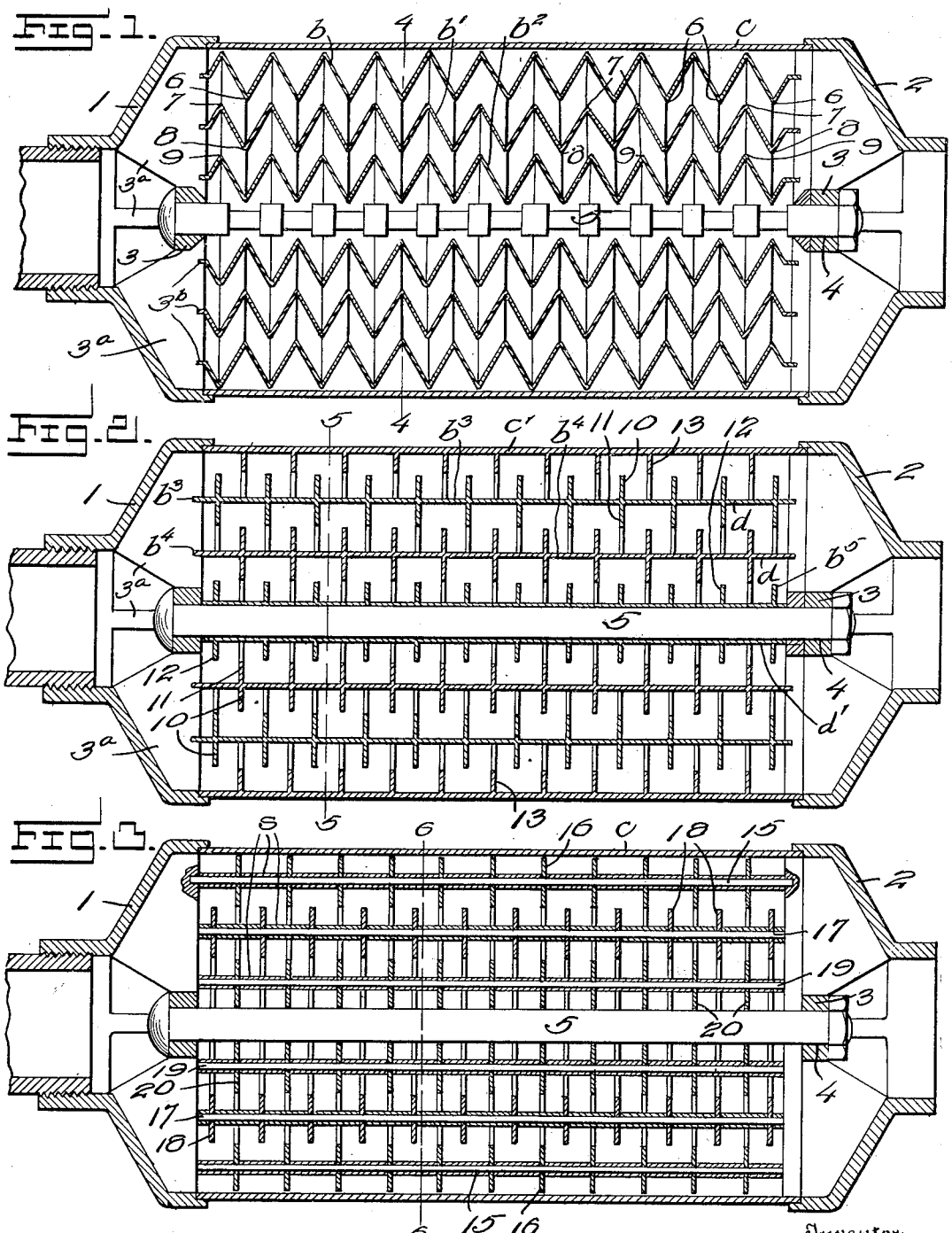

UNITED STATES PATENT OFFICE.

PATRICK J. COLLINS, OF PHILADELPHIA, PENNSYLVANIA, ASSIGNOR, BY DIRECT AND MESNE ASSIGNMENTS, TO AMERICAN SILENCER COMPANY, OF PHILADELPHIA, PENNSYLVANIA, A CORPORATION OF DELAWARE.

MUFFLER FOR ENGINES.

1,067,467. Specification of Letters Patent. Patented July 15, 1913.

Application filed December 21, 1912. Serial No. 738,088.

*To all whom it may concern:*

Be it known that I, PATRICK J. COLLINS, a citizen of the United States, residing at Philadelphia, in the county of Philadelphia and State of Pennsylvania, have invented certain new and useful Improvements in Mufflers for Engines, of which the following is a specification.

The purpose of my invention is to provide a muffler for attachment to the exhaust pipe of internal combustion engines, which muffler will be efficient in silencing the exhaust and which will be simple in construction and easily assembled and taken apart.

In the accompanying drawing, Figure 1 is a longitudinal central section through a muffler composed of concentrically arranged baffling members having cylindrical corrugations; Fig. 2 is a similar view showing a muffler having cylindrical baffling members with annular ribs or plates; Fig. 3 is a similar view of the muffler having annular baffling plates arranged upon rods; Fig. 4 is a section on the line 4—4 of Fig. 1; Fig. 5 is a section on the line 5—5 of Fig. 2; Fig. 6 is a section on the line 6—6 of Fig. 3; and, Fig. 7 is an inner end view of one of the heads of the muffler.

Referring to Figs. 1, 4, and 7 of the drawing, 1 and 2 indicate the ends or heads of the muffler and $c$ indicates a cylindrical casing clamped between the heads. The heads are alike in construction, each head being hollow and having within it a spider 3 provided with a central opening or bolt hole 4. Each spider comprises a plurality of radial arms $3^a$ in which are cut recesses $3^b$ to receive the ends of tubular baffling members, $b$, $b'$, $b^2$. The heads, in the completed muffler, are connected by a bolt 5 passing through the openings 4 in the spiders, and the baffling members are thus held firmly in position. Each baffling member, as shown in Figs. 1 and 4, is corrugated circumferentially, the corrugations being substantially V-shaped as shown, and the apices 6 of the corrugations in the outer member $b$ are alternately arranged with respect to the apices 7 of the intermediate member $b'$, the apices 8 of the latter member being also alternately arranged with the apices 9 of the innermost member $b^2$. The widths of the corrugations from the apices 7 to the apices 8 of the intermediate member are such that when one of the heads is off of the muffler this member may be inserted or removed from the casing without interfering or interlocking with the corrugations of the outer and inner members. Similarly, the outer and inner members may be inserted or removed from the casing without interlocking with the intermediate member. There is, however, only clearance enough between the intermediate and inner and outer members to permit of this insertion and removal of the parts, as it is desirable to cause the gases to follow a tortuous course through the muffler and to avoid having a straight passageway for the gases.

In assembling the muffler shown in Fig. 1, the casing is placed upon one of the heads and the baffling members are then inserted and fitted into the central grooves $3^b$ and the other head is then applied, grooves $3^b$ in the latter head engaging the other ends of the baffling members and the heads are then secured together by a bolt. It will be evident that this form of muffler can be manufactured cheaply because of the convenience of assembling and the similarity of the parts, the heads being alike, and the baffling members also being alike in form.

In Figs. 2 and 5, a modified form of muffler is shown. In this case, the heads 1 and 2 are similar to those in the previously described figures. In Figs. 2 and 5 are shown two baffling members $b^3$ and $b^4$, each comprising a cylinder $d$ having annular flanges or plates 10 on their outer sides and similar flanges or plates 11 on their inner sides, the plates 10 and 11 on each cylinder being in the same plane. The plates 10 on the member $b^4$ are alternately arranged with respect to plates 11 on the member $b^3$. Within the member $b^4$ and surrounding the bolt 5 is another cylindrical baffling member $b^5$, comprising a cylinder $d'$, having annular flanges or plates 12 alternately arranged with respect to the plates 11 on the member $b^4$, and on the interior wall of the casing $c'$ are annular plates or flanges 13, alternately arranged with respect to the flanges or plates 10 of the member $b^3$. The flanges on the various baffling members are spaced equal distances apart lengthwise of the muffler and the width of the baffling portions or flanges on the cylinders is such that each cylinder may be inserted or removed from the casing without having its flanges interlock with the flanges on adjoining members, the clearance, however, between the flanges on adjacent members being made as small as possible. In this form of device it will be evident that the gases will follow a tortuous course between the baffling members and it will also be evident that the parts can be readily assembled and taken apart.

In the form shown in Figs. 1 and 2, the baffling members are tubular and are in the nature of cylindrical partitions having baffling portions.

In Figs. 3 and 6 of the drawing, a modification is shown in which annular baffling plates or rings are arranged upon rods instead of upon cylinders, the ends of these rods fitting into recesses in the arms of the spiders in the heads. Thus, upon the outer series of rods 15 is arranged a series of rings 16, evenly spaced apart, and upon the intermediate series of rods 17 is arranged a series of rings 18 and upon the inner series of rods 19 is arranged a series of rings 20, the rings upon each series being alternately arranged with respect to the rings on the adjacent series of rods and the width of the rings being such that each baffling member may be moved longitudinally into and out of the casing without having its rings interfere with the rings of an adjacent member, the clearance between the rings on adjacent members being, however, very slight. It will be evident that in a muffler thus constructed the gases will be compelled to follow a tortuous course and that ample room will be allowed for expansion of the gases and that the device may be readily assembled.

What I claim is:

1. A muffler comprising an inclosing casing having heads at its ends, and a plurality of concentrically arranged baffling members connected to said heads, each baffling member having a plurality of annular deflecting portions or ribs alternately arranged with respect to the deflecting portions of the adjacent members, said deflecting portions being of such width as to permit said portions on one member to pass the similar portions on adjacent members, with slight clearance, while the members are being inserted or removed endwise from the casing.

2. A muffler comprising an inclosing casing having heads at its ends, and a plurality of concentrically arranged baffling members connected to said heads, each baffling member comprising a cylinder having a plurality of annular deflecting portions or ribs alternately arranged with respect to the deflecting portions of the adjacent members, said deflecting portions being of such width as to permit said portions on one member to pass the similar portions on adjacent members, with slight clearance, while the members are being inserted or removed endwise from the casing.

3. A muffler comprising an inclosing casing having heads at its ends, and a plurality of concentrically arranged baffling members connected to said heads, each baffling member comprising a circumferentially corrugated cylinder the apices of the corrugations on one member being alternately arranged with respect to the apices of the corrugations on adjacent members, and said corrugations being of such width as to permit one member to pass between adjacent members with slight clearance while the members are being inserted or removed endwise from the casing.

4. A muffler comprising two hollow heads having spiders therein, and having ports, concentric baffling members having their ends abutting against said spiders, and means for clamping the heads against the ends of the baffling members.

5. A muffler comprising two hollow heads having spiders therein, and having ports, the arms of said spiders having grooves, tubular baffling members having their ends fitting in said grooves, and means for clamping the spiders against said members.

6. A muffler comprising two hollow heads having spiders therein, and having ports, tubular circumferentially-corrugated baffling members having their ends abutting against said spiders, and means for clamping the spiders against said ends.

7. A muffler comprising two hollow heads having ports, a tubular circumferentially corrugated baffling member having its ends connected to said heads, and a baffling member extending axially through said tubular member.

In testimony whereof I have affixed my signature, in presence of two witnesses.

PATRICK J. COLLINS.

Witnesses:
M. E. GRAYSON,
A. J. NICK.